United States Patent [19]

Longman, Jr.

[11] 3,869,084

[45] Mar. 4, 1975

[54] METHOD FOR DESIGNING AN INTEGRATING CIRCUIT WITH A FINITE MEMORY AND THE RESULTANT APPARATUS

[75] Inventor: Millard Dumas Longman, Jr., Miami Beach, Calif.

[73] Assignee: Coulter Electronics, Inc., Hialeah, Fla.

[22] Filed: Aug. 20, 1973

[21] Appl. No.: 389,422

[52] U.S. Cl. .................. 235/183, 235/197, 328/167

[51] Int. Cl. .............................................. G06g 7/18

[58] Field of Search ........... 235/183, 197, 152, 156; 328/167, 127, 151

[56] References Cited

UNITED STATES PATENTS

| | | | |
|---|---|---|---|
| 3,219,940 | 11/1965 | Cooke-Yarborough | 328/127 |
| 3,543,012 | 11/1970 | Courtney | 235/197 |
| 3,619,586 | 11/1971 | Hoff et al. | 235/156 |
| 3,746,889 | 7/1973 | Cubbison, Jr. | 328/167 |
| 3,760,289 | 9/1973 | Hurtig | 328/167 |

OTHER PUBLICATIONS

Paul (Textbook): Fundamental Analogue Techniques, 1965 (1966 USA), McMillan Co, N.Y., pp. 155–182.

Soderstrand et al.: Gain and Sensitivity Limitations of Active RC Filters, IEEE Trans. on Circuit Theory Vol. CT–18, No. 6, Nov. 1971, p. 600–609.

Steber et al.: On a Completely Tunable Active Filter Using Fixed RC Elements, IEEE Proceedings, April 1969, pp. 727–728.

Steber et al.: Additional Comments on Realizing System Functions, IEEE Proceedings, Aug. 1971, pp. 1251–1253.

Tow: A Step by Step Active-Filter Design, IEEE Spectrum, Dec. 1969, pp. 64–68.

Korn & Korn (Textbook): Electronic Analog Computers, 2nd edit., McGraw-Hill, 1956, pp. 13 and 415.

Kerwin et al.: State Variable Synthesis for Insensitive Integrated Circuit Transfer Functions, IEEE Journal of Solid State Circuits, Vol. SC–2, No. 3, Sept. 1967, pp. 87–92.

Holt et al.: Active RC Filters Employing a Single Operational Amplifier to Obtain Biquadratic Responses Proc. IEEE, Vol. 112, No. 10, Dec. 1965, p. 2227–2234.

*Primary Examiner*—Felix D. Gruber
*Attorney, Agent, or Firm*—Silverman & Cass, Ltd.

[57] ABSTRACT

Method for designing an integrating circuit and the resultant apparatus having a finite memory such that an accurate average of events over a time period just ended can be obtained without having events occurring previous to the time period affecting the resultant data. The method comprises the steps of: forming a polynomial expression by taking a continued fraction expansion of the Laplace transformation expression $$F(s) = 1/s\,T\,[1 - e^{-s\,T}]$$

where T is a predetermined period of time. The polynomial is solved using Bessel's coefficient equation and expressed as an approximate transfer function of the desired circuit response. Network synthesis techniques are applied to the approximate transfer function to design the approximately ideal integrator circuit.

8 Claims, 5 Drawing Figures

METHOD FOR DESIGNING AN INTEGRATING CIRCUIT WITH A FINITE MEMORY AND THE RESULTANT APPARATUS

BACKGROUND OF THE INVENTION

This invention is directed to integrating circuits and more particularly to an integrator that forgets events that happened before a predetermined period of time.

A ratemeter is a device which obtains averages per unit time of a number of events happening more or less randomly, such as a series of particle pulses as described in the U.S. Pat. Nos. 2,656,508 and 2,985,830. An integrator can act as a ratemeter if the input to the integrator, i.e., pulses, are identical in width and height and the integrator has a finite memory. In the past, ratemeters were built using an RC network coupled to act as an integrator. In such an RC circuit, every time an event occurred, i.e., everytime a pulse signal was coupled thereto, a small amount of charge would be stored in the capacitor. As more pulses were coupled into the circuit more charge would be stored in the capacitor. The voltage across the capacitor then would be an indication of the rate of the pulses. The voltage across a capacitor decays exponentially at a rate determined by the RC time constant. The charge decay in the capacitor introduces error into the rate reading. To better understand this error, assume a pulse is coupled to the RC circuit such that a voltage of unit value appears across the capacitor in the RC circuit. Due to charge leakage associated with the capacitor, the voltage across the capacitor decays and at a time of approximately one second, assume the voltage across the capacitor had reduced to one-half unity. If a second identical pulse had been coupled to the RC circuit at approximately 0.9 seconds after the first pulse, the output of the RC circuit will be approximately 1.5 units. If one wanted to measure the rate of pulses per second, the RC circuit would provide an output voltage that represents a rate of approximately 1.5 pulses per second when the actual rate is approximately two pulses per second. From the above it can be seen that a pulse coupled to the RC circuit at the end of the rate period, i.e., one second, is not given the same weight or value as the pulse coupled to the circuit at the beginning of the rate period. Therefore, it is desirable to have an accurate average of events over a time period just ended with each event occurring within the time period given equal weight with other events occurring within that same time period. It is also desirable to have events occurring previous to the time period just ended not affecting the resultant rate.

In the past, attempts to design a ratemeter or integrator with a finite memory which ideally would forget events that occur after a predetermined period of time, resulted in circuitry that introduced a great deal of error into the rate reading. Such an attempt was described by J. Strackee, "An Improved Rate Meter," in Digest of 1961, International Conference on Medical Electronics. The desired ideal integrator with a finite memory would have the following Laplace transformation response for an impulse input signal:

$$F(s) = 1/s\ T\,[1 - e^{-sT}] \qquad (1)$$

where $s = \alpha + j\omega$, and T is the predetermined period for which the circuit would remember.

Strackee used a Pade series to expand equation (1) for the synthesis of equation (1) into a practical circuit which was fully described in his article. The response of the circuit will be described subsequently in the discussion of FIG. 2. Strackee's approximation introduced a great deal of error into the rate reading when the Pade series is expanded past the third order and implemented into a circuit. A circuit implemented from a Pade's series and expanded past the third order has been proven to become unstable, as described by John Stewart in "Fundamentals of Signal Theory" McGraw-Hill, 1960.

A similar attempt at implementing or synthesizing equation (1) into a practical circuit was described by Bantwal et al., "Distributed Network Design for Time-Domain Specifications," "IEEE Transactions of Circuit Theory," September, 1971. The error associated with the Strackee circuit was further reduced, but undesirable negative transitions occurred which subtracted from the integrators's total output signal.

A third attempt at implementing equation (1) into a practical circuit was described in "Philbrick Application Manual" Article III .25, Philbrick Research, 1966. A Paynter approximation was used and response of the described circuit will be discussed subsequently in the discussion of FIG. 2. The Philbrick circuit which implemented the Paynter approximation resulted in a residual error, i.e., the circuit never actually "forgets"; for periods greater than one second, a residual voltage would remain proportional to the amplitude of the impulse input.

It has been known that circuits which exhibit a characteristic as described by equation (1) can be used as a matched filter to separate a waveform of known shape from random perturbing noise as long as the transfer function of the circuit is linear. Such a matched filter improves the signal to noise ratio of a system in which it is used.

SUMMARY OF THE INVENTION

A method and apparatus for providing an integrating circuit with a finite memory which has an impulse transfer function that approximates the Laplace transformation expression $$F(s) = 1/s\ T\,[1 - e^{-sT}]$$

where T is a predetermined period of time. The method comprises the steps of expressing the impulse transfer function as a polynomial expression which is a result of the continued fraction expansion of $e^{-sT}$. The polynomial is solved by using Bessel's coefficient equation and the order to which the polynomial is to be expanded is chosen. The polynomial is expressed as an approximate transfer function of the desired circuit response and the integrating circuit is designed from the approximate transfer function utilizing network synthesis techniques.

One embodiment of the invention comprises the utilization of operational amplifier synthesis techniques to design an integrating circuit with a finite memory where the order of expansion was chosen as being three.

DETAILED DESCRIPTION OF THE INVENTION

Figure 1:
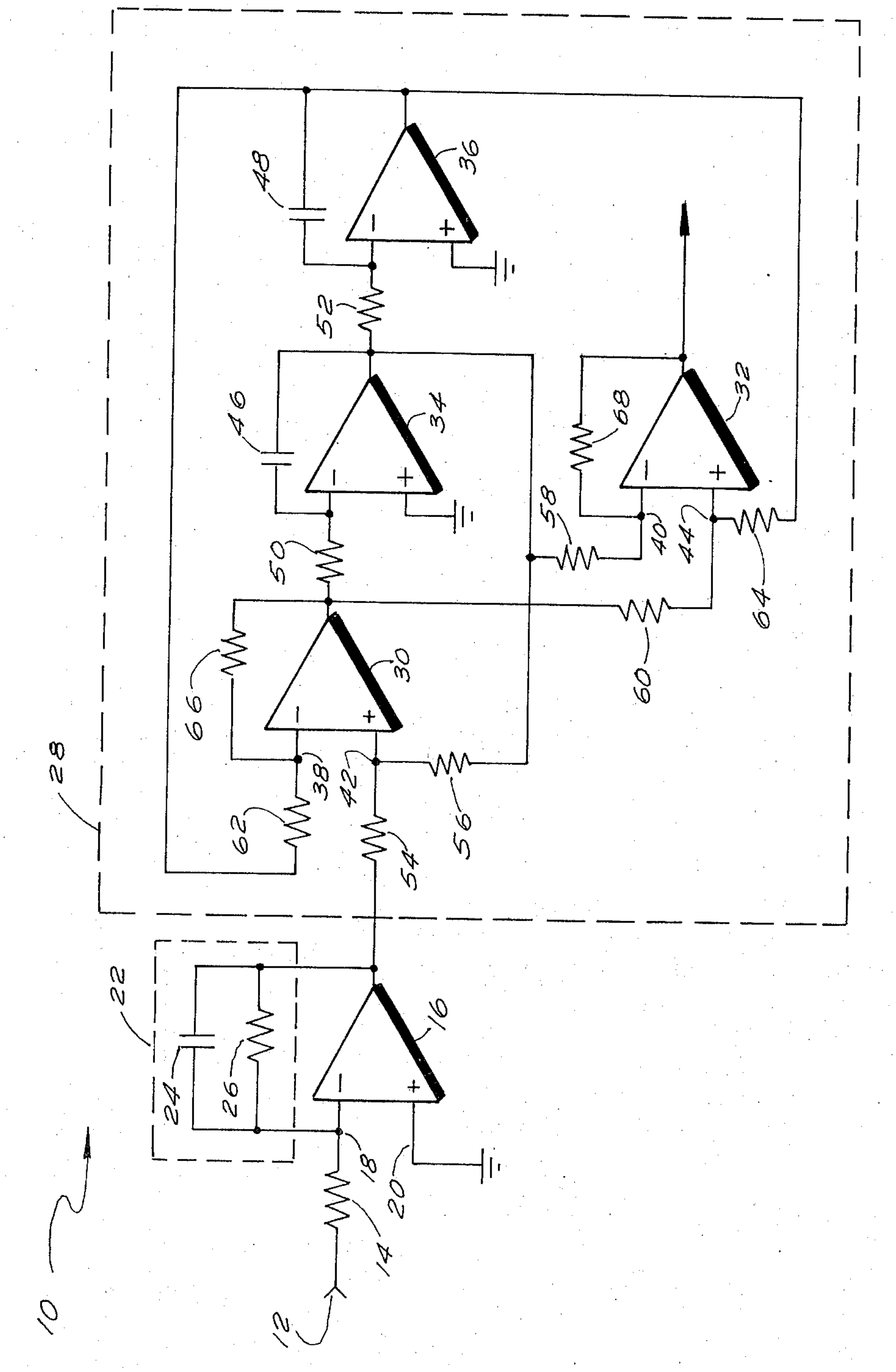
FIG. 1 is a schematic diagram of a circuit embodying the invention.

To better understand the invention to be described, a brief explanation of the expansion of the term $E^{-s}$ is needed:

$$(2)\qquad e^{-s} = \frac{a_o}{\sum_{K=o}^{N} a_K s^K}$$

where the coefficient $a_K$ is computed by using Bessel's equation:

$$(3)\qquad a_K = \frac{(2N-K)}{2^{N-K}\,(N-K)\,!K!}$$

The development of equation (2) and $a_K$ for different values of N are given in Network *Theory: Analysis and Synthesis*, by Shlomo Karni, Allyn and Bacon 1966, which herein is incorporated by reference. The following expression is derived by applying the polynomial approximation of equation (2) to equation (1):

$$(4)\qquad F(s) = \frac{1}{sT}\left[\frac{\sum_{K=1}^{N} a_K (sT)^K}{\sum_{K=o}^{N} a_K (sT)^K}\right];$$

and, choosing the value of $N$=3, the equation (4) becomes:

$$(5)\qquad F(s)= \frac{1}{sT}\left[1 - \frac{15}{(sT)^3 + 6(sT)^2 + 15\,(sT) + 15}\right]$$

$$= \frac{2.322/sT}{1 + 2.322/sT}\cdot\left[\frac{.43s^2 + (2.58/T)\,s + 6.45/T^2}{s^2 + (3.678/T)\,s + 6.45/T^2}\right]$$

After reduction, with $T$=10 seconds, equation (5) becomes:

$$F(s) = 0.1/(s + 0.2322)\ [(s^2 + 0.6s + 0.15)/(s^2 + 0.3678s + 0.0645)] \qquad 6.$$

The synthesis of equation (6) into a functional circuit presents problems since there is a second order term in equation (6) which has complex transmission zeros, i.e. the complex frequencies at which the output signal equals zero.

The implementation of the equation (6) utilizing operational amplifier synthesis techniques into a circuit can be accompanied by the use of a circuit commonly referred to as a biquadratic circuit. Operational amplifier synthesis of such a biquadratic circuit from a polynomial expression is described by Kerwin, et al., in "State Variable Synthesis," *IEEE Journal Solid State Circuits*, volume SC–2, pp. 87–92, September, 1967. Kerwin, et al. provides the steps necessary to realize an integrated circuit structure for any N degree of transfer function.

As will be shown subsequently in the discussion of FIG. 1, a biquadratic circuit is shown therein with circuit having a single pole impulse transfer function for implementing equation (1) into an operational circuit which provides optimum characteristics as N goes to infinity in equation (6). A single pole impulse transfer function describes a circuit where the output signal goes to infinity at a given frequency with an impulse input. It should be understood that other circuits can be constructed utilizing the teachings of this invention for various values of N and T. The values of $N$=3 and $T$=10 seconds have been chosen by way of example only.

In FIG. 1, an integrating circuit embodying the invention utilizing operational amplifier network synthesis techniques is indicated generally by the reference character 10. Input pulses that are to be average over a period T, are coupled to an input terminal 12 through a resistor 14 to an operational amplifier coupled to respond as a low pass amplifier 16. Low pass amplifier 16 is comprised of inverting and non-inverting input terminals 18 and 20 respectively. The output of the low pass amplifier 16 is coupled between negative feedback circuit 22 and the inverting input terminal 18. The negative feedback circuit 22 is comprised of parallel coupled capacitor and resistor 24 and 26 respectively. The low pass amplifier 16, as described, provides a single pole impulse transfer function which implements the Laplace transfer expression:

$$(2.322/T)/[s+ (2.322/T)]$$

The output of the low-pass amplifier 16 is coupled to a biquadratic circuit 28 which comprises two summing amplifiers 30 and 32, each having an inverting input terminal 38 and 40, respectively, and a non-inverting input terminal 42 and 44, respectively, and two integrating amplifiers 34 and 36, each having negative feedback applied through respective capacitors 46 and 48. The output of summing amplifier 30 is coupled through a resistor 50 to integrator 34 and the output of integrator 34 is coupled through a resistor 52 to integrator 36.

The values of resistors 50 and 52 and capacitors 46 and 48 in conjunction with the gains of summing amplifiers 30 and 32 determine the time constant of biquadratic circuit 28. In this embodiment of the invention the finite memory period of integrating circuit 10 has been chosen as 10 seconds by way of example only. The output of low pass amplifier 16 is coupled through a resistor 54 to the terminal 42. Also coupled to terminal 42 through a resistor 56 is the output of integrator 34. The output of integrator 34 also is coupled through a resistor 58 to the terminal 40. The output of the summing amplifier 30 is coupled through a resistor 60 to the terminal 44.

The output of integrator 36 is coupled through a resistor to the terminal 38 and through a resistor 64 to the terminal 44.

The gains of summing amplifiers 30 and 32 respectively are determined by negative feedback resistors 66 and 68. Resistor 66 is coupled between the output of summing amplifier 30 and terminal 38 and the resistor 68 is coupled between the output of summing amplifier 32 and terminal 40. The output of summing amplifier 32 is the output of circuit 10.

Biquadratic circuit 28 is coupled to provide a Laplace impulse transfer function equivalent to the expression:

$$\frac{.43s^2 + \frac{2.58s}{T} + \frac{6.45}{T^2}}{s^2 + \frac{3.678s}{T} + \frac{6.45}{T^2}} \quad \text{from equation (5).}$$

When T, the time period for which circuit 10 remembers, has been chosen, the values of the resistors in the biquadratic circuit 28 are calculated according to the teachings of Kerwin as described previously.

Figure 2:
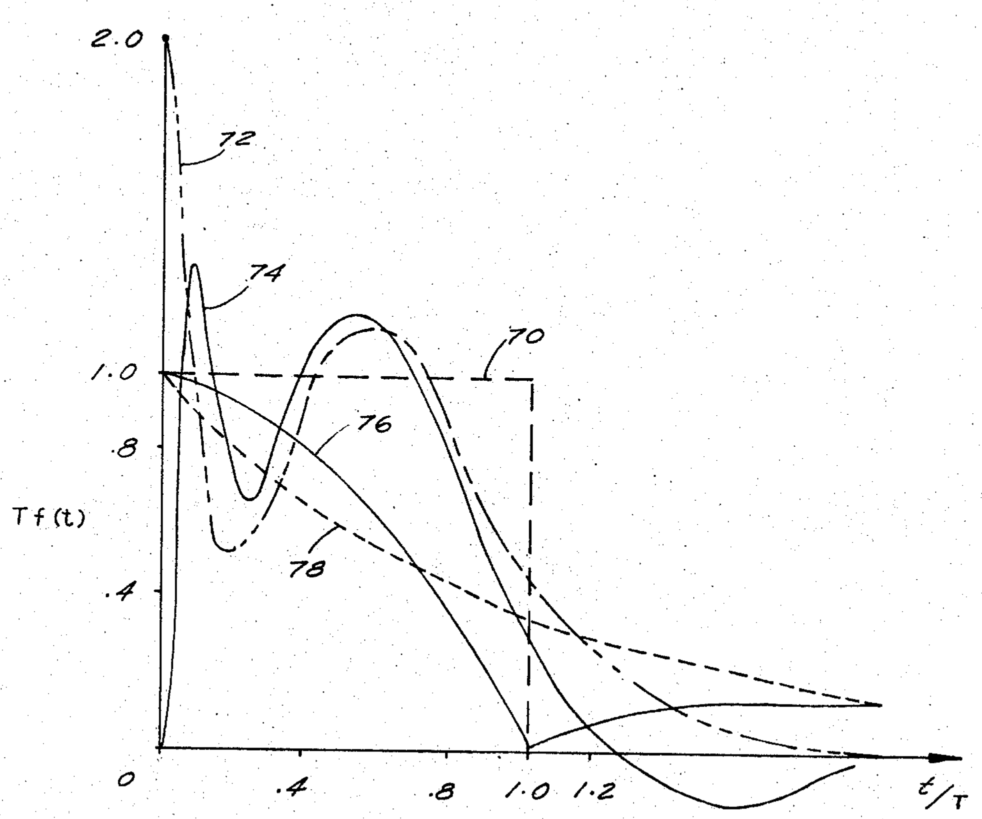
FIG. 2 comprises curves of the impulse responses of prior art systems attempting to approximate equation (1)

To understand fully the operation and to comprehend the advantages of the embodied invention described herein, reference is made to FIG. 2.

FIG. 2 contains curves which represent the normalized response of prior art circuits to an impulse input.

Curve 70 represents the ideal response of a circuit which would, for example, remember a first impulse signal having an amplitude of unity for a period of one second and then at the end of one second totally "forget" the first impulse signal. A circuit having such a response would have the transfer function described by equation (1). If a second impulse signal of unity amplitude should arrive at a time for example, 0.4 seconds after the first impulse signal, the output of the ideal circuit would have a value of two units at 0.4 seconds which would drop to one unit after one second and zero units after 1.4 seconds.

The circuit described in the previously mentioned Strackee article has a third order response to an impulse signal represented by a curve 72. As can be seen, there is quite a variation in the Strackee circuit's ability to remember an event over a period of time. Strackee's circuit must respond such that the output immediately jumps to two units at the beginning of the input impulse signal such that over the period T, the circuit has an average of one unit.

The previously mentioned Bantwal et al., circuit has a third order response to an impulse input represented by a curve 74. As can be seen, the Bantwal et al., circuit has a negative memory, i.e., the output of the circuit is inverted for an impulse input after a given period of time, which would in effect, subtract from the overall output signal.

The previously described Philbrick circuit has a third order response to an impulse represented by a curve 76. The Philbrick circuit never actually forgets. The Philbrick circuit has a very undesirable response since previously occurring events have an additive effect upon the output of the circuit.

Curve 78 represents the impulse response of an RC coupled integrator circuit as described previously. Such a circuit is very well known in the art and need not be described herein but the response of the circuit to an impulse output is present for comparison purposes only. The charge on the capacitor of RC circuit leaks off the capacitor such that the voltage across the capacitor decays exponentially as shown by curve 78. Accordingly, if two impulse signals of equal magnitude are coupled to the circuit, for example, within 0.5/T seconds of each other, the output of the RC integrating circuit at $t$=0.5/$T$ seconds would be approximately 1.5 units instead of 2 units.

Figure 3:
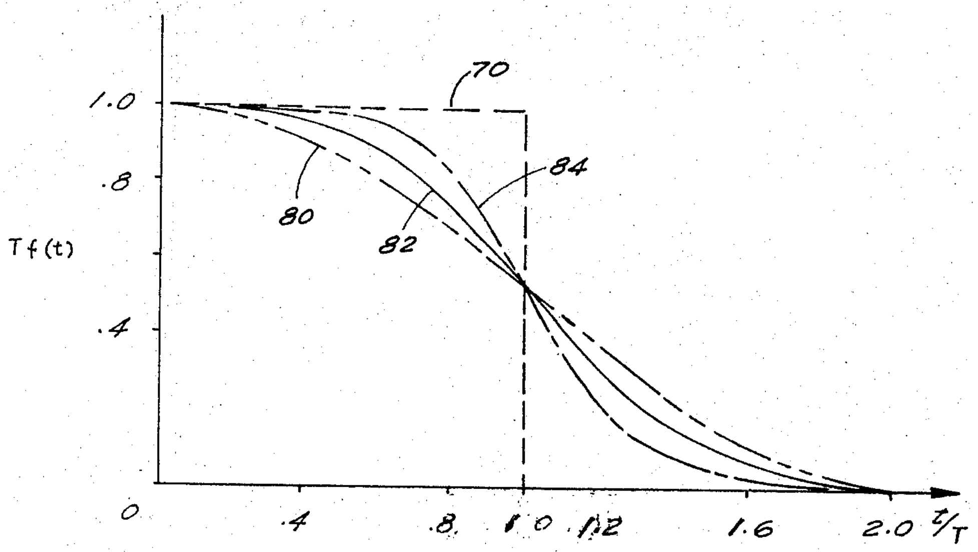
FIG. 3 comprises curves of the impulse responses of circuits embodying the invention.

In FIG. 3, a curve 80 shows the impulse response of the circuit 10 of FIG. 1. Curves 82 and 84 respectively, represent the impulse response of circuits that were synthesized from equation (4) where N was chosen as 5 and 10, respectively. Once again the curve 70 represents the ideal response of a circuit approximating the equation (1) and is shown here for comparison.

To express numerically the advantage of circuits embodying the invention, a quality factor is defined as the ratio of the time the circuit remembers 90% of the input signal to the time the circuit remembers 10% of the input signal. For a RC circuit, to which equation (1) reduces to when $N$=1, the quality factor is 0.042; for N equal to 3, i.e., the circuit 10 of FIG. 1, the quality factor is 0.25; for $N$=5, 10, and infinity, the quality factors are respectively, 0.409, 0.546, and 1.00. For values of N greater than 3, operational amplifier synthesis of a circuit which approximates equation (1) becomes impractical, therefore for practical applications, $N$=3 is presently the optimum value to choose for designing a rate circuit approximating equation (1).

The following component values are presented for an integrator with a finite memory of 10 seconds with N chosen as 3 and, if coupled as shown in FIG. 1, will have a impulse transfer function taking the form of the curve 80 shown in FIG. 3:

| | |
|---|---|
| Resistor 14 | 1,050,000 ohms |
| Resistor 26 | 358,000 ohms |
| Resistors 50, 52 | 250,000 ohms |
| Resistors 54, 64, 68 | 10,000 ohms |
| Resistor 56 | 19,000 ohms |
| Resistor 58 | 9,160 ohms |
| Resistor 60 | 1,500 ohms |
| Resistor 62 | 100,000 ohms |
| Resistor 66 | 6,450 ohms |
| Capacitor 24 | 12 microfarads |
| Capacitor 46, 48 | 4 microfarads |
| Los Pass Amplifier 16 | NE 536 Signetics |
| Summing Amplifiers 30, 32 | NE 536 Signetics |
| Integrating Amplifiers 34, 36 | NE 536 Signetics |

The design of a rate circuit which expands the polynomial expression of equation (4) into the fifth order, i.e., $N$=5, would comprise a single pole amplifying circuit, and two biquadratic circuits appropriately coupled in accordance with the synthesis of the factored polynomial expression which is generated. The fifth order circuit is not illustrated for discussion due to the complexities of the circuit synthesis. Any person skilled in the art can utilize the teachings of this invention to design a circuit which approximates the impulse response of equation (1).

Figure 4:
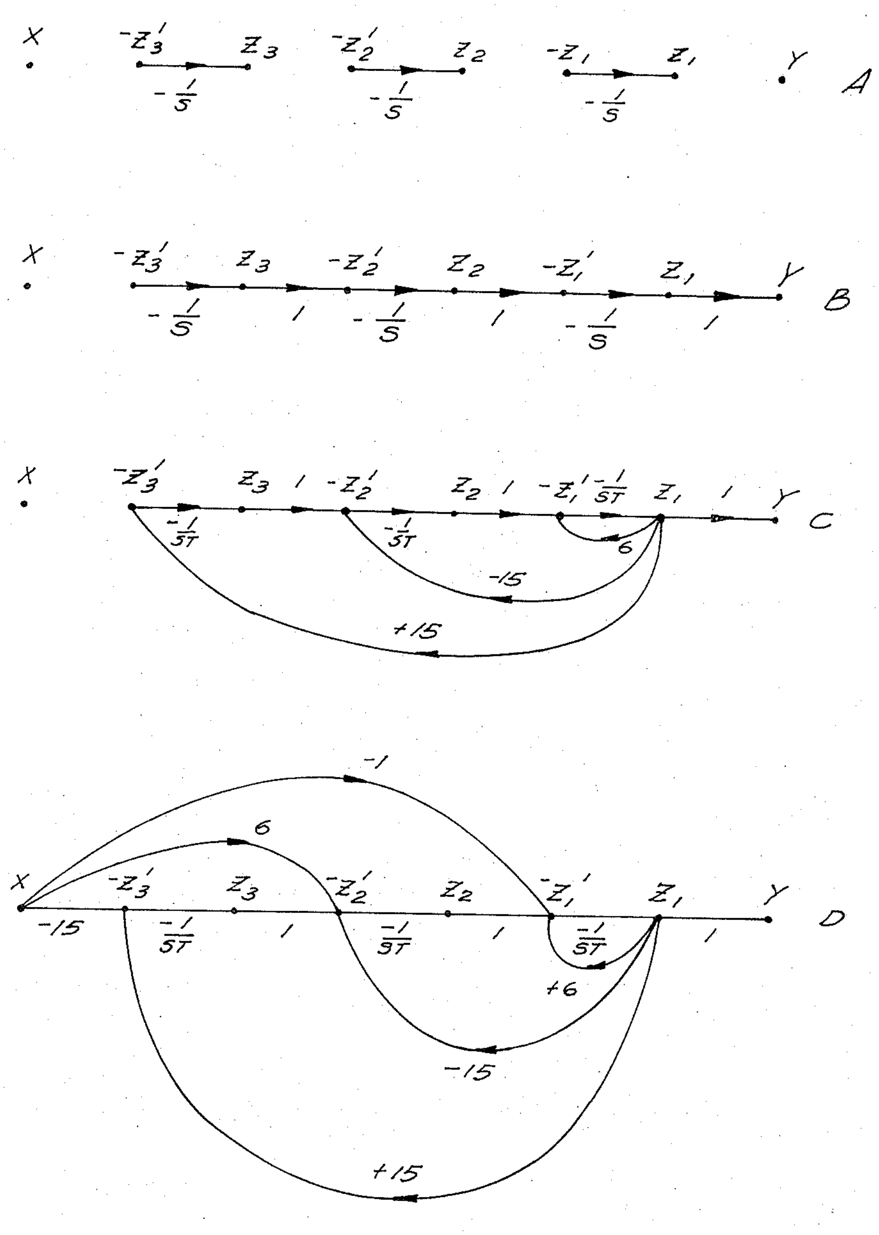
FIG. 4A – 4D are representations of the steps necessary in the construction of a signal-flow diagram.

In order to illustrate operational amplifier synthesis, the polynomial transfer function, shown in equation (6), can be expressed:

$$Y/X = f_1(s) = [(sT)^2 + 6\,sT + 15]/[(sT)^3 + 6\,(sT)^2 + 15\,sT + 15\,] \qquad (7)$$

a signal flow diagram is drawn utilizing the following steps:

a. Since this is a third order system, three integrators are needed, (FIG. 4A).

b. Arbitrarily the three integrator outputs are called $Z_1$ $Z_2$, and $Z_3$ as indicated in FIG. 4A. Accordingly, the integrator inputs are $-Z_1'$, $-Z_2'$, and $-Z_3'$, respectively.

c. $Z_3$ is connected to $-Z_2'$; $Z_2$ to $-Z_1'$, and $Z_1$ to Y by unity branches as shown in FIG. 4B.

d. The numerator and the denominator of $F_1(s)$ are divided by $S^3$ in order to put a "1" into the first term of the denominator.

$$(8)\quad F_1(s) = \frac{\frac{1}{sT} \quad \frac{6}{(sT)^2} \quad \frac{15}{(sT)^3}}{1 + \frac{6}{sT} + \frac{15}{(sT)^2} + \frac{15}{(sT)^3}}$$

e. Feedback loops shown in 4C are added to FIG. 4B in such a way that the denominator of $F_1(s)$ is realized in the signal flow diagram of FIG. 4C. Mason's reduction theorem indicates that the simplest situation exists when all loops are touching, then the denominator is one minus the sum of all the loop gains:

$$\Delta = 1 - \Sigma Fi \qquad (9)$$

To be sure that all the loops touch, all loops are started from $Z_1$ in FIG. 4B. Then the desired loop gains are $- 6/sT,\ - 15/(sT)^2$, and $- 15/(sT)^3$.

The first gain can be realized by a branch from $Z_1$ to $-Z_1'$ of gain +6; the second, $Z_1$ to $-Z_2'$ of gain −15; and the last, $Z_1$ to $-Z_3'$ of gain + 15. FIG. 4C realizes the desired denominator of $F(s)$ in equation (8).

f) We now turn to the numerator and take the simplest approach by making sure that all direct paths (X to Y) pass through $Z_1$, so that the numerator is just $\Sigma\ \pi$, i.e., all $\Delta\ i = 1$. Equation (8) reveals the desired path gains of $1/s$T, $6/(sT\ )^2$ and $15/(sT,\ )^3$. The last is realized by a branch gain −15 from X to $-Z_3'$; the second by a gain of 6 from X to $-Z_2'$; and the first, by a gain of −1 from X to $Z_1'$. The final system is shown in FIG. 4D. Accordingly, by choosing a value for T, the RC time constant for the integrators used therein is specified. FIG. 4D represents the flow diagram of the circuit shown in FIG. 1 with $T$=10 seconds.

The previous described steps for the operational amplifier synthesis of a third order polynominal was described by J. G. Truxal in *Inductory Systems Engineering*, page 179, McGraw-Hill 1972. The above steps were followed in the synthesis of equation (4) in arriving at the circuit 10 of FIG. 1.

The utilization of digital synthesis techniques for designing a digital circuit from a Laplace transfer function similar to equation (4) was described in the previously mentioned Truxal book, supra, at page 464.

Chart (I) next is presented for converting Laplace transformation polynomials into a $z$ transformation polynomial. A $z$ transform polynomial is a Laplace transformation with every $s$ replaced by the natural lograithm of $z$.

CHART I

| R O W | Column 1 | Column 2 | Column 3 | Column 4 |
|---|---|---|---|---|
| | Laplace Transform | Time Function | $z$ transform | Description of time function |
| $a$ | 1 | $\delta(t)$ | 1 | Impulse function at $t = 0$ |
| $b$ | $e^{-nTs}$ | $\delta(t-n\mathrm{T})$ | $1/z^n$ | Impulse function at $t = n\mathrm{T}$ |
| $c$ | $1/1-e^{-Ts}$ | $i(t)$ | $z/z-1$ | Train of impulses at sampling instants |
| $d$ | $1/s$ | $u(t)$ | $z/z-1$ | Step function |
| $e$ | $1/s^2$ | $t$ | $\mathrm{T}z/(z-1)^2$ | Ramp function |
| $f$ | $1/s^3$ | $(1/2)t^2$ | $(1/2)\mathrm{T}^2\ z(z+1)/(z-1)^3$ | Quadratic or acceleration function |
| $g$ | $1/s+a$ | $e^{-at}$ | $z/z-e^{-aT}$ | Exponential function |
| $h$ | $a/s^2+a^2$ | sin $at$ | $z \sin a\mathrm{T}/z^2-2z \cos a\mathrm{T}+1$ | Sinusoidal Function |

Utilizing chart I, the $z$ transformation polynomial, herein designated as $D(z)$, can be realized into a circuit comprised of delay elements and ladders simply by using the same procedures employed for operational amplifier synthesis of a Laplace transfer function. The integrator $1/s$ is replaced by the delay element $1/z$. Signal flow diagrams similar to the one shown in the FIG. 4D but formed from a $z$ transform polynomial are constructed and a circuit is built from the signal flow diagram.

Other types of network synthesis techniques can be used utilizing the teachings of this invention. For example, the biquadratic Laplace transfer function of equation (4) can be realized by utilizing the teachings of R. S. Shukla and B. N. Mishra in their articles "Minimal Realization of Biquadratic RC-Transfer Function," in *IEEE Transactions in Circuit Theory*, March, 1973, and "Synthesis of 3-terminal RC Networks, "in *Proc. IEEE*, Vol. 113, No. 3, March, 1966.

Figure 5:
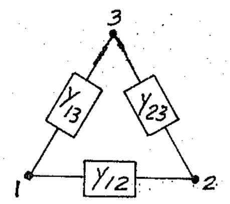
FIG. 5 is a schematic of a three terminal network.

A general passive two-terminal network can always be represented by a three terminal configuration network as shown in FIG. 5 with one terminal grounded or at a reference potential. Choosing a polynomial $Q\ (s)$, $F(s)$ is given by:

$$F(s) = [k(s^2 + 2as + p^2)/Q(s)][(s + c_1)(s + c_2)/Q(s)]$$

Knowing that for a three terminal configuration network as shown in FIG. 5:

$F(s) = Y_{12}/(Y_{12} + Y_{23})$ (11)

By comparing (10) and (11):

$Y_{12} = [k\ (s^2 + 2\ as + p^2)]/[Q(s)] = ]k\ N\ (s)/[Q(s)]$ , (12)

$Y_{23} = [(1-k)s^2 + (c_1 + c_2 - 2ka)s + (c_1c_2-kp^2)] = [D(s)]/[Q(s)$ (13)

Let the remaining transfer admittance be chosen as:

$Y_{13} = P(s)/Q(s)$ (14)

where P($s$) is a polynomial in $s$.

In order that the $\pi$ structure be RC realizable, it should meet the following three necessary conditions:

Condition 1: Let $[k\ N(s) + D(s)]/[Q(s)]$, $[D(s) + P(s)]/[Q(s)]$, and $[P(s) + kN(s)]/[Q(s)]$be RC admittances. Accordingly, with $Q(s) = (s + B)$, $Y_{12} = n_x s + n_o + (ns/s{+}B)$ (15)

$Y_{23} = d_x s + d_o + (ds/s{+}B)$ (16)

and $Y_{13} = p_x + p_o + (ps/s{+}B)$ (17)

Condition 2: Let $kN(s)/Q(s)$, $D(s)/Q(s)$ and $P(s)/Q(s)$ be positive functions. Let $p = p_o = 0$.

Condition 3: The residues $n$, $d$, and $p$ should be such that:

$Nd + dp + pn \geq 0$ (18)

Accordingly:

$Y_{13} = -[(nd/n + d)\ s]/[s + B]$ (19)

Using admittance expansion, one may rewrite (13) and (12) as $Y_{12} = ks + [(2a - B - p^2/B)s]/[(s + B)] + (kp^2)(B)$ (20)

and $Y_{23} = (1-k)s + [c_1c_2-kp^2]/[B] - s\ [(c_1+c_2-ak)-B(-1-k)-(c_1c_2-kp^2]/(s+B)$ (21)

By comparing (20) and (21) with (15) and (16) respectively, the following is obtained:

$n_x = k,\ n_o = kp^2,\ n{=}k\ (2a{-}B{-}p^2/B),\ d_x = 1-k,\ d_o = [c_1c_2 - kp^2]/B$ (22)

and $d = (c_1 + c_2 - 2ak) - B(1-k) - (c_1c_2 - kp^2)$ (23)

Thus (19) becomes:

$$(24)\quad Y_{13} = k\,\frac{\left[\left(\left(\frac{p^2}{B}\right) + B - 2a\right)\left(c_1 + c_2 - 2ak - B(1-k) - c_1c_2 - kp^2\right)\right] s}{\left[(c_1 + c_2 - B) - (c_1c_2 - kp^2) - \frac{kp^2}{B}\right](s+B)}$$

From the above, a set of transfer admittances given by the three equations (20), (21), and (24) may be used to realize a passive network having the Laplace transformation expression of equation (10). The polynomial expression (6) can be put into the form of equation (10) and a passive configuration network can be synthesized from equations (20), (21), and (24).

What is desired to be secured by Letters Patent of the United States is:

1. An integrating circuit with a finite memory for providing a signal output that is a function of the average of events over a time period just ended with the events occurring previous to the time period having minimum effect on the output signal, said circuit comprising:

a low-pass amplifying circuit for receiving input signals, said amplifying circuit responding to an impulse input signal coupled thereto such that an output signal from said amplifying circuit is an exponentially decaying function of time;

a biquadratic circuit coupled to receive the output signal of said low-pass amplifying circuit, said biquadratic circuit having an impulse transfer function which can be expressed as at least a second order polynomial expression such that an output signal of said biquadratic circuit, when said output signal from said low-pass amplifying circuit is coupled thereto, remains approximately constant for a period of time after which the output signal of said biquadratic circuit decays rapidly to a second lower constant level.

2. An integrating circuit as claimed in claim 1 wherein said low-pass amplifying circuit comprises an amplifying circuit which has coupled thereto a negative feedback circuit which is frequency dependent.

3. An integrating circuit as claimed in claim 1 wherein said biquadratic circuit comprises:

first and second summing amplifiers each having inverting and non-inverting inputs and each amplifier having respectively first and second negative feedback circuits coupled thereto;

first and second integrating circuits each having inverting inputs and each having an identical time constant;

the output of said first summing amplifier being coupled through a first resistive device to the non-inverting input of said second summing amplifier and also coupled through a second resistive device to the inverting input of said first integrating circuit;

the output of said first integrating circuit being coupled through a third resistive device to the non-inverting input of said first summing amplifier and also coupled through a fourth resistive device to the inverting input of said second summing amplifier;

the inverting input of said second integrating circuit being coupled through a fifth resistive device to the output of said first integrating circuit, the output of said second integrating circuit being coupled through a sixth resistive device to the inverting input of said first summing amplifier and also being coupled through a seventh resistive device to the non-inverting input of said second summing amplifier;

the output of said low-pass amplifying circuit being coupled through an eighth resistive device to the non-inverting input of said first summing amplifier; and the output of said second summing amplifier defining the output of said integrating circuit with a finite memory.

4. An integrating circuit as claimed in claim 2 wherein said biquadratic circuit comprises;

first and second summing amplifiers each having inverting and non-inverting inputs and each having respectively first and second negative feedback circuits coupled thereto;

first and second integrating circuits each having inverting inputs;

the output of said first summing amplifier being coupled to the non-inverting input of said second summing amplifier and also being coupled to the inverting input of said first integrating circuit;

the output of said first integrating circuit coupled to the non-inverting input of said first summing amplifier and also coupled to the inverting input of said second summing amplifier;

the inverting input of said second integrating circuit coupled to the output of said first integrating circuit, the output of said second integrating circuit coupled to the inverting input of said first summing amplifier and also coupled to the non-inverting input of said second summing amplifier;

the output of said low-pass amplifying circuit coupled to the non-inverting input of said first summing amplifier; and the output of said second summing amplifier defining the output of said integrating circuit with a finite memory.

5. An integrating circuit with a finite memory having a Laplace impulse transfer function which approximates the expression $1/sT\,[1 - e^{-sT}]$ in which T is a predetermined period of time, said integrating circuit comprising:

a first circuit coupled to receive input signals and constructed to have a single pole Laplace impulse transfer function which is approximately equivalent to the expression:

$(2.322/sT)/(1 + 2.322/sT)$;

and, a second circuit coupled to the output of said first circuit and constructed to have the Laplace polynomial impulse transfer function which is approximately equivalent to the expression:

$[0.43s^2 + (2.58/T)s + 6.45/T^2]/[s^2 + (3.678/T)s + 6.45/T^2]$

6. An integrating circuit with a finite memory for providing a signal output that is a function of the integral of the input signal over a predetermined time period just ended with the input signal present previous to the predetermined time period having substantially no effect on the output signal, said circuit comprising:

first circuit means for receiving said input signal and developing in response thereto a first circuit signal, said first circuit means constructed and arranged to develop a first circuit signal that is an exponentially decaying function of time in response to an impulse input signal, and second circuit means coupled to said first circuit means and operative in response to said first circuit signal to develop said output signal, said second circuit means constructed and arranged to have an impulse transfer function which can be expressed as at least a second order polynomial expression and operative in response to an impulse input signal to develop an output signal having a first level for said predetermined time period, said output signal level rapidly decaying to a second lower constant level after said predetermined time period.

7. The integrating circuit of claim 6 wherein said first circuit means is a low-pass amplifier.

8. The integrating circuit of claim 6 wherein said second circuit means is a biquadratic circuit.

* * * * *

UNITED STATES PATENT AND TRADEMARK OFFICE

CERTIFICATE OF CORRECTION

PATENT NO. : 3,869,084

DATED : August 18, 1975

INVENTOR(S) : MILLARD D. LONGMAN, JR.

It is certified that error appears in the above-identified patent and that said Letters Patent are hereby corrected as shown below:

IN THE ABSTRACT: Line 9, replace the formula shown with:

$$F(s) = \frac{1}{sT}\left[1 - e^{-sT}\right]$$

Column 1, line 63, replace the formula shown with:

$$F(s) = \frac{1}{sT}\left[1 - e^{-sT}\right]$$

Column 2, line 44, replace the formula shown with:

$$F(s) = \frac{1}{sT}\left[1 - e^{-sT}\right]$$

Column 3, line 9, replace "E" with -- e --.

Column 3, line 60, replace the formula shown with the following formula:

$$(6)\ F(s) = \frac{.1}{s + .2322}\left[\frac{s^2 + .6s + .15}{s^2 + .3678s + .0645}\right]$$

UNITED STATES PATENT AND TRADEMARK OFFICE

CERTIFICATE OF CORRECTION

PATENT NO. : 3,869,084

DATED : August 18, 1975

INVENTOR(S) : MILLARD D. LONGMAN, JR.

It is certified that error appears in the above-identified patent and that said Letters Patent are hereby corrected as shown below:

Column 6, line 60, in the formula shown delete "$f_1(s)$" and substitute -- $F_1(s)$ --.

Column 8, line 12, delete "s" and substitute -- "s" --;

Column 8, line 66, delete the equations shown and substitute the following equation:

$$(10) \quad F(s) = \frac{k(s^2 + 2as + p^2)\ /Q(s)}{(s + c_1)\ (s + c_2)\ /Q(s)}$$

UNITED STATES PATENT AND TRADEMARK OFFICE

CERTIFICATE OF CORRECTION

PATENT NO. : 3,869,084

DATED : August 18, 1975

INVENTOR(S) : MILLARD D. LONGMAN, JR.

It is certified that error appears in the above-identified patent and that said Letters Patent are hereby corrected as shown below:

Column 9, lines 3 and 4, delete the formula shown and substitute the following formula:

$$Y_{12} = \frac{k\ (s^2 + 2\ as + p^2)}{Q\ (s)} = \frac{k\ N\ (s)}{Q(s)} \qquad (12)$$

Column 9, lines 5 and 6, delete the formula shown and substitute the following formula:

$$Y_{23} = \frac{(1-k)s^2 + (c_1 + c_2 - 2ka)s + (c_1 c_2 - kp^2)}{Q(s)} \qquad (13)$$

$$= \frac{D(s)}{Q(s)}$$

Column 9, line 15, delete the formula shown and substitute the following formula:

$$Y_{12} = n_{\infty} s + n_o + \frac{ns}{s+B} \qquad (15)$$

Column 9, line 16, delete the formula shown and substitute the following formula:

$$Y_{23} = d_{\infty} s + d_o + \frac{ds}{s+B} \qquad (16)$$

Column 9, line 18, delete the formula shown and substitute the following formula:

$$Y_{13} = p_{\infty} + po + \frac{ps}{s + B} \qquad (17)$$

UNITED STATES PATENT AND TRADEMARK OFFICE

CERTIFICATE OF CORRECTION

PATENT NO. : 3,869,084
DATED : August 18, 1975
INVENTOR(S) : MILLARD D. LONGMAN, JR.

It is certified that error appears in the above-identified patent and that said Letters Patent are hereby corrected as shown below:

Column 9, lines 29 and 30, delete the formula shown and the word "and" and substitute the following $$Y_{12} = ks + \frac{(2a - B - p^2/B)s}{(s + B)} + \frac{kp^2}{B}, \qquad (20)$$

and

Column 9, lines 31 and 32, delete the formula shown and substitute the following formula:

$$Y_{23} = (1-k)s + \frac{c_1c_2 - kp^2}{B} - s\left[\frac{(c_1 + c_2 - ak) - B(1-k) - (c_1c_2 - kp^2)}{(s+B)}\right]. \qquad (21)$$

Column 9, lines 35 and 36, delete the formulas shown and substitute the following formula:

$$n_\infty = k,\ n_o = kp^2,\ n = k\,(2a - B - p^2/B), \qquad (22)$$

$$d_\infty = 1-k,\quad d_o = \frac{c_1c_2 - kp^2}{B}, \text{ and}$$

Signed and Sealed this

*thirtieth* Day of *March 1976*

[SEAL]

*Attest:*

RUTH C. MASON
*Attesting Officer*

C. MARSHALL DANN
*Commissioner of Patents and Trademarks*

UNITED STATES PATENT AND TRADEMARK OFFICE

CERTIFICATE OF CORRECTION

PATENT NO. : 3,869,084

DATED : January 27, 1976

INVENTOR(S) : MILLARD D. LONGMAN, JR.

It is certified that error appears in the above-identified patent and that said Letters Patent are hereby corrected as shown below:

Column 6, line 66, after "$Z_1$" insert a comma.

Column 7, lines 6 through 10 add a plus sign between the terms $\frac{1}{sT}$ and $\frac{6}{(sT)^2}$ and between quantities $\frac{6}{sT^2}$ and $\frac{15}{sT^3}$ Column 8, line 12, delete "s" and substitute -- "s" --;

lines 12 and 13, delete "lograithm" and substitute -- logarithm --.

Signed and Sealed this

*twenty-fifth* Day of *May 1976*

[SEAL]

*Attest:*

RUTH C. MASON
*Attesting Officer*

C. MARSHALL DANN
*Commissioner of Patents and Trademarks*